United States Patent
Chen et al.

(10) Patent No.: US 12,428,019 B2
(45) Date of Patent: Sep. 30, 2025

(54) ELECTRONIC DEVICE FOR AUTONOMOUS DRIVING AND CONFIGURATION METHOD THEREOF

(71) Applicant: Quanta Computer Inc., Taoyuan (TW)

(72) Inventors: Yu-Tsai Chen, Taoyuan (TW); Ta-Chuan Chiu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 906 days.

(21) Appl. No.: 17/321,275

(22) Filed: May 14, 2021

(65) Prior Publication Data

US 2022/0204021 A1 Jun. 30, 2022

(30) Foreign Application Priority Data

Dec. 29, 2020 (TW) ................................. 109146570

(51) Int. Cl.
*B60W 60/00* (2020.01)
*G06F 13/28* (2006.01)

(52) U.S. Cl.
CPC ........... *B60W 60/001* (2020.02); *G06F 13/28* (2013.01); *B60W 2420/403* (2013.01); *G06F 2213/28* (2013.01); *G06F 2213/3808* (2013.01)

(58) Field of Classification Search
CPC .. B60R 16/0231; B60R 16/03; B60W 60/001; B60W 2420/403; B60W 2050/0006; B60W 50/023; B60W 60/00; G06F 13/28; G06F 2213/28; G06F 2213/3808; G06F 15/7803
See application file for complete search history.

(56) References Cited

U.S. PATENT DOCUMENTS

2017/0247040 A1* 8/2017 Miller ................. G05D 1/0248
2019/0258251 A1* 8/2019 Ditty .................... G05D 1/0274
(Continued)

FOREIGN PATENT DOCUMENTS

| CN | 110228472 A | 9/2019 |
|----|-------------|--------|
| CN | 111025959 A | 4/2020 |

OTHER PUBLICATIONS

Chinese language office action dated Nov. 24, 2021, issued in application No. TW 109146570.
(Continued)

*Primary Examiner* — Abby J Flynn
*Assistant Examiner* — Paulo Roberto Gonzalez Leite
(74) *Attorney, Agent, or Firm* — McClure, Qualey & Rodack, LLP

(57) ABSTRACT

An electronic device, applied on a smart car with a plurality of sensors, includes at least one network switching circuit, at least one motherboard circuit, and a power supply circuit. The network switching circuit is coupled to the sensors of the smart car to receive sensing data from the sensors and to output the sensing data. The motherboard circuit includes a network interface controller and at least one CPU. The network interface controller is coupled to network switching circuit to receive the sensing data from the network switching circuit. The CPU is coupled to the network interface controller to perform autonomous driving for the smart car according to the sensing data. The number of network switching circuits and motherboard circuits depends on the autonomous driving level of the smart car.

7 Claims, 6 Drawing Sheets

(56) References Cited

U.S. PATENT DOCUMENTS

2019/0279119 A1    9/2019  Hirose et al.
2020/0061811 A1*   2/2020  Iqbal .................. G06N 3/08
2020/0276989 A1    9/2020  Garcia et al.
2022/0274610 A1    9/2022  Chen

OTHER PUBLICATIONS

Chinese language office action dated Sep. 20, 2023, issued in application No. CN 202110083175.3.

* cited by examiner

ELECTRONIC DEVICE FOR AUTONOMOUS DRIVING AND CONFIGURATION METHOD THEREOF

CROSS REFERENCE TO RELATED APPLICATIONS

This application claims priority to and the benefit of Taiwan Application No. 109146570, filed on Dec. 29, 2020, the entirety of which is incorporated by reference herein.

Field of the Disclosure

The disclosure is related to an electronic device, and in particular it is related to an electronic device for autonomous driving and a configuration method thereof.

Description of the Related Art

With the continuous development of artificial intelligence technology, unmanned autonomous driving cars are the ultimate goal of technological development. According to the Society of Automotive Engineers (SAE), autonomous vehicles are divided into levels 0 to 5 for different levels of autonomous driving. The higher the level is, the higher the degree of self-driving is performed, but higher levels are harder to achieve. Different levels of autonomous driving cars have different numbers of sensors, and the amount of data input by the sensors is also different. Therefore, the required arithmetic processing performance is not the same between different levels of self-driving cars, so that the hardware design of the control system of the autonomous driving car may be different due to the different levels of autonomous driving, which may cause the hardware architecture of the control system to be complicated, increasing the cost.

In most hardware architecture design and development processes, the hardware architecture design of the control systems for different levels of autonomous driving cars are developed separately. That is, a level 3 autonomous driving car has its own control system, and a level 4 autonomous driving car likewise has its own control system. If the initial hardware architecture design cannot meet the performance required by the level of the autonomous driving car, it is necessary to be re-evaluated and re-designed, and then re-verified whether it meets this performance requirement. However, the hardware architecture design of the control system may take a long time, at relatively high labor costs.

BRIEF SUMMARY OF THE DISCLOSURE

In order to resolve the issue described above, the present disclose provides an electronic device applied on a smart car with a plurality of sensors. The electronic device includes at least one network switching circuit, at least one motherboard circuit, and a power supply circuit. The network switching circuit is coupled to the sensors of the smart car to receive sensing data from the sensors and output the sensing data. The motherboard circuit includes a network interface controller (NIC) and at least one central processing unit (CPU). The NIC is coupled to the network switching circuit to receive the sensing data from the network switching circuit. The CPU is coupled to the NIC and performs autonomous driving for the smart car according to the sensing data. The power supply circuit provides power to the network switching circuit and the motherboard circuit. The number of network switching circuits and motherboard circuits depends on the autonomous driving level of the smart car.

According to the electronic device disclosed above, the motherboard circuit further includes at least one memory coupled to the CPU. The CPU includes a direct memory access (DMA) controller. The DMA controller directly accesses the sensing data in the memory.

According to the electronic device disclosed above, the motherboard circuit further includes a platform controller hub (PCH) and a storage. The PCH receives the sensing data from the network switching circuit, and stores the sensing data in the storage, or sends the sensing data to the CPU to perform the autonomous driving for the smart car.

According to the electronic device disclosed above, the motherboard circuit includes at least one graphics processing unit (GPU) to process image-related data and assist the CPU to perform the autonomous driving for the smart car.

According to the electronic device disclosed above, the higher the autonomous driving level of the smart car, the more network switching circuits and motherboard circuits are required.

According to the electronic device disclosed above, the network switching circuit includes a first interface, a second interface, and an Ethernet physical chip. The first interface is coupled to the sensors of the smart car. The second interface is coupled to the motherboard circuit. The Ethernet physical chip receives the sensing data of the sensors through the first interface, and sends the sensing data to the motherboard circuit through the second interface.

According to the electronic device disclosed above, the network switching circuit further includes a processor and a micro controller. The processor processes the sensing data for data security. The micro controller provides a security function to the network switching circuit, and detects power and temperature of the network switching circuit.

The present disclosure also provides a method for configuring a calculation engine, including at least one network switching circuit and at least one motherboard circuit, of a smart car. The method includes determining the autonomous driving level of the smart car; configuring the calculation engine of the smart car according to the autonomous driving level; wherein the calculation engine comprises a first number of network switching circuits and a second number of motherboard circuits; performing a calculation performance verification corresponding to the determined autonomous driving level on the calculation engine to obtain a performance score; and determining that the calculation performance of the calculation engine meets the requirement when the performance score is greater than a threshold.

According to the method disclosed above, the method further includes determining that the calculation performance of the calculation engine does not meet the requirement when the performance score is less than the threshold; increasing the first number, so that the calculation engine includes a third number of network switching circuits; increasing the second number, so that the calculation engine comprises a fourth number of motherboard circuits; and re-executing the calculation performance verification corresponding to the determined autonomous driving level.

According to the method disclosed above, the first number is less than the second number, and the third number is less than the fourth number.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

In order to make the above purposes, features, and advantages of some embodiments of the present disclosure more comprehensible, the following is a detailed description in conjunction with the accompanying drawing.

It should be understood that the words "comprise" and "include" used in the present disclosure are used to indicate the existence of specific technical features, values, method steps, operations, units and/or components. However, it does not exclude that more technical features, numerical values, method steps, work processes, units, components, or any combination of the above can be added.

The words "first", "second", "third", "fourth", "fifth", and "sixth" are used to describe components; they are not used to indicate the priority order of or advance relationship, but only to distinguish components with the same name.

Figure 1:
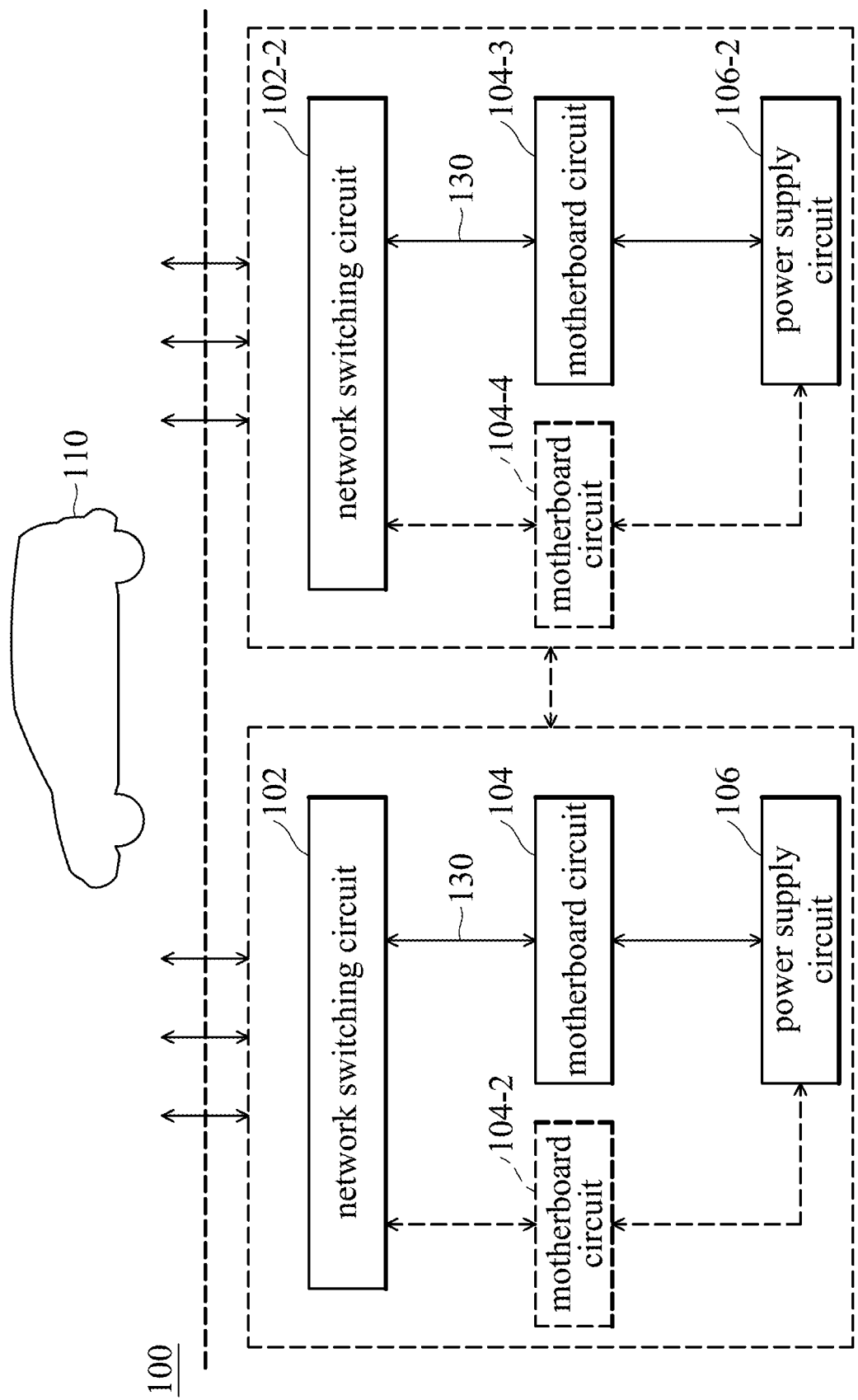
FIG. 1 is a schematic diagram of an electronic device 100 in accordance with some embodiments of the disclosure.

FIG. 1 is a schematic diagram of an electronic device 100 in accordance with some embodiments of the disclosure. As shown in FIG. 1, the electronic device 100 includes a network switching circuit 102, a motherboard circuit 104, and a power supply circuit 106. The network switching circuit 102 receives sensing data from a plurality of sensors of a smart car 110. In some embodiments, the connection line 120 is a 10 Gigabit Ethernet line, for example, a 10GBASE-T network line. The smart car can sense its surrounding environment with technologies such as RF radar, an optical radar, satellite navigation system (GNSS), and image recognition. In other words, the sensing data related to the RF radar, the optical radar, GNSS, and image recognition may be sent to the network switching circuit 102 through the connection line 120.

Then, the network switching circuit 102 sends the received sensing data (such as distance data from the RF radar and optical radar, positioning data from the satellite navigation system, or image data for image recognition, etc.) to the motherboard circuit 104 through the connection line 130. The motherboard circuit 104 then performs autonomous driving for the smart car according to the sensing data received from the network switching circuit 102. The electronic device 100 of the present disclosure allows the vehicle to drive automatically when conditions permit through the data input by the sensor, so that the smart car 110 can perform tasks including turning, changing lines, and accelerating according to the set road rules. In some embodiments, the connection line 130 is a 10 Gigabit Ethernet line, for example, a 10GBASE-T network line. The power supply circuit 106 provides power to the network switching circuit 102 and the motherboard circuit 104 through the power line 140. In some embodiments, the electronic device further includes another power supply circuit (not shown) connected in parallel with the power supply circuit 106 to provide a backup power.

Since the smart car 110 (for example, an autonomous car) itself needs to be equipped with many sensors to sense its surrounding environment, the space of the control system (for example, the electronic device of the present disclosure) that the smart car 110 can be equipped with is limited, and the overall size of the control system cannot be expanded indefinitely. Therefore, in a limited space, in order to respond to different autonomous driving levels, the electronic device 100 of the present disclosure may change the number of network switching circuits 102 and motherboard circuits 104 according to the applied autonomous driving level.

For example, when the electronic device 100 of the present disclosure is to be applied to the smart car 110 with the autonomous driving level 2, the electronic device 100 needs to include the network switching circuit 102, the motherboard circuit 104, and the power supply circuit 106, so that the motherboard circuit 104 can perform autonomous driving level 2 operations. When the electronic device 100 of the present disclosure is to be applied to the smart car 110 with the autonomous driving level 3, the electronic device 100 not only needs to include the original network switching circuit 102, the motherboard circuit 104, and the power supply circuit 106, but also needs to add an expanded motherboard circuit 104-2. That is, the motherboard circuit 104 and the motherboard circuit 104-2 need to perform coordinated autonomous driving operations to complete the autonomous driving level 3. When the electronic device 100 of the present disclosure is to be applied to the smart car 110 with the autonomous driving level 4, the electronic device 100 not only needs to include the original network switching circuit 102, the motherboard circuits 104 and 104-2, and the power supply circuit 106, but also needs to add expanded motherboard circuits 104-3 and 104-4, and even adds a network switching circuit 102-2 to electrically other motherboard circuits. The electronic device 100 further includes the power supply circuit 106-2 to provide power to the motherboard circuits 104-3 and 104-4 and the network switching circuit 102-2. That is, the motherboard circuits 104, 104-2, 104-4 and 104-4 need to perform coordinate autonomous driving operations to complete the autonomous driving level 4. In other words, the electronic device 100 of the present disclosure uses hardware expansion or reduction of modular network switching circuits, modular motherboard circuits, and modular power supply circuits to achieve different autonomous driving levels.

Figure 2:
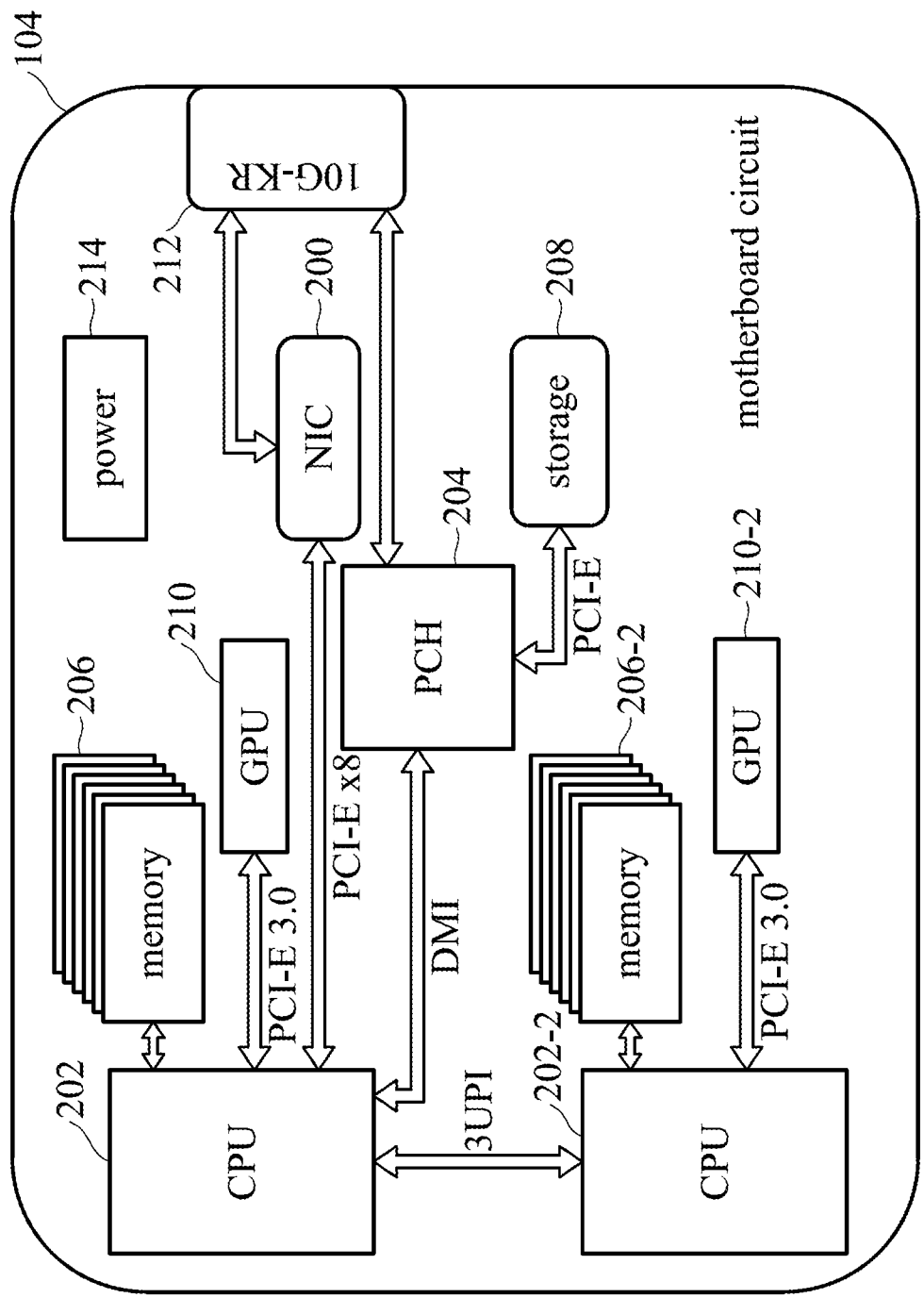
FIG. 2 is schematic diagram of a motherboard circuit 104 of the electronic device 100 in FIG. 1 in accordance with some embodiments of the disclosure.

FIG. 2 is schematic diagram of a motherboard circuit 104 of the electronic device 100 in FIG. 1 in accordance with some embodiments of the disclosure. Due to the modularization, the circuit structure of the motherboard circuits 104-2 and 104-3 in FIG. 1 is the same ad that of the motherboard circuit 104, so FIG. 2 only uses the circuit structure of the motherboard circuit 104 as an example. As shown in FIG. 2, the motherboard circuit 104 includes a network interface controller (NIC) 200, a central processing unit (CPU) 202, a platform controller hub (PCH) 204, a memory 206, a storage 208, a graphics processing unit (GPU) 210, a connector 212, and a power 214. In some embodiments, the connector 212 is electrically connected to the network switching circuit 102 in FIG. 1. In some embodiments, the connector 212 is a 10GBASE-KR connector, but the present disclosure is not limited thereto.

The NIC 200 receives the sensing data from the network switching circuit 102 in FIG. 1 through the connector 212, and sends the sensing data to the CPU 202 through a PCI-e bus (for example, a PCI-e x8 bus). After the CPU 202 receives the sensing data from the NIC 200, the CPU 202 performs autonomous driving operations of the smart car 110 according to the sensing data. In some embodiments, in order to handle different autonomous driving levels, the CPU 202 can be coupled to another CPU 202-2 through high-speed channel interconnection system bus technology (for example, 3UPI), so that the motherboard circuit 104 becomes a dual CPU system. In some embodiments, in order to handle different autonomous driving levels, the number of cores of the CPUs 202 and 202-2 can be upgraded from 10 cores to a maximum of 28 cores to speed up computing efficiency.

In some embodiments, the PCH 204 receives the sensing data from the network switching circuit 102 through the connector 212, and stores the sensing data in the storage 208 through the PCI-e bus. In some cases, when the CPU 202 needs to read the sensing data stored in the storage 208, the CPU 202 sends a request to the PCH 204 through a direct media interface (DMI) bus. After the PCH 204 receives the request, the PCH 204 reads the sensing data in the storage 208, and sends the sensing data to the CPU 202 through the DMI bus. In some embodiments, the storage is a solid state drive (SSD), such as an M.2 SSD, but the present disclosure is not limited thereto. In order to handle different autonomous driving levels, the storage capacity of the storage 208 can be upgraded from 128 GB to a maximum of 1 TB.

In some embodiments, the GPU 210 communicates with the CPU 202 through a PCI-e 3.0 bus to process image-related sensing data (such as image data for image recognition), and assist the CPU 202 to perform autonomous driving of the smart car 110. Similarly, the GPU 210-2 communicates with the CPU 202-2 through the PCI-e 3.0 bus, thereby increasing the calculation and judgement performance of the motherboard circuit 104 on the image-related sensing data. In some embodiments, the GPUs 210 and 210-2 are SXM2 GPUs, but the present disclosure is not limited thereto.

The memory 206 is electrically coupled to the CPU 202, and the memory 206-2 is electrically coupled to the CPU 202-2. In some embodiments, the memories 206 and 206-2 are dynamic random-access memories (for example, DDR4 RAM). In order to handle different autonomous driving levels, the memory capacity of the memories 206 and 206-2 can be expanded from 8 GB to a maximum capacity of 768 GB. In some embodiments, the power 214 is from the power supply circuit 106 in FIG. 1 to provide power to all components of the motherboard circuit 104 in FIG. 2.

In some embodiments, since the sensing data from the sensors of the smart car 110 all need to pass through the network switching circuit 102, the sensing data can flow to any one motherboard circuit. Furthermore, the electronic device 100 of the present disclosure can determine which motherboard circuit to process data by the processor of the motherboard circuit with higher control power according to the current requirements and hardware composition.

Figure 3:
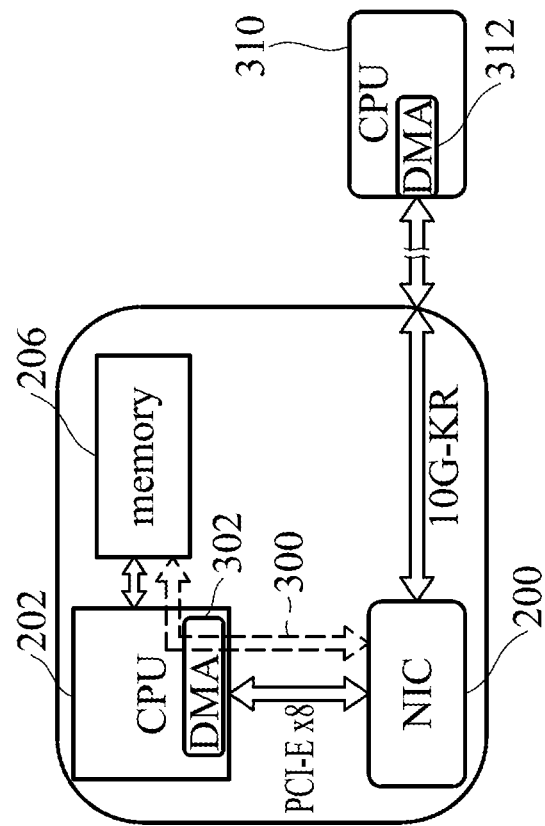
FIG. 3 is a schematic diagram of performing sensing data transmission by a network interface controller 200 of the motherboard circuit 104 in FIG. 2 in accordance with some embodiments of the disclosure.

FIG. 3 is a schematic diagram of performing sensing data transmission by a network interface controller 200 of the motherboard circuit 104 in FIG. 2 in accordance with some embodiments of the disclosure. As shown in FIG. 3, in some embodiments, the CPU 202 of the electronic device 100 includes a direct memory access (DMA) controller 312, and the smart car 110 also includes a CPU 310 with a DMA controller 312. In some embodiments, the CPU 310 of the smart car 110 can be a sensing processor to process or collect sensing data from multiple sensors on the smart car 110. In the embodiment shown in FIG. 3, the DMA controller 302 can directly and independently access the memory 206 through the high-speed network interface 300 (such as a system bus), so that the NIC 200 receives the sensing data accessed by the DMA controller 302.

The sensing data is transmitted through the 10GBASE-KR network line (for example, the connection line 130 in FIG. 1), the network switching circuit 102 in FIG. 1, and the connection line 120 in FIG. 1. The DMA controller 312 of the CPU 310 of the smart car 110 can directly access the sensing data from the memory 206 without the intervention processing of the CPUs 202 and 310, so as to save the load and utilization rate of the CPUs 202 and 310. In some embodiments, through the fast data transmission method of the DMA controller 302, the data transmission performance and efficiency of the NIC 200 can be optimized.

Figure 4:
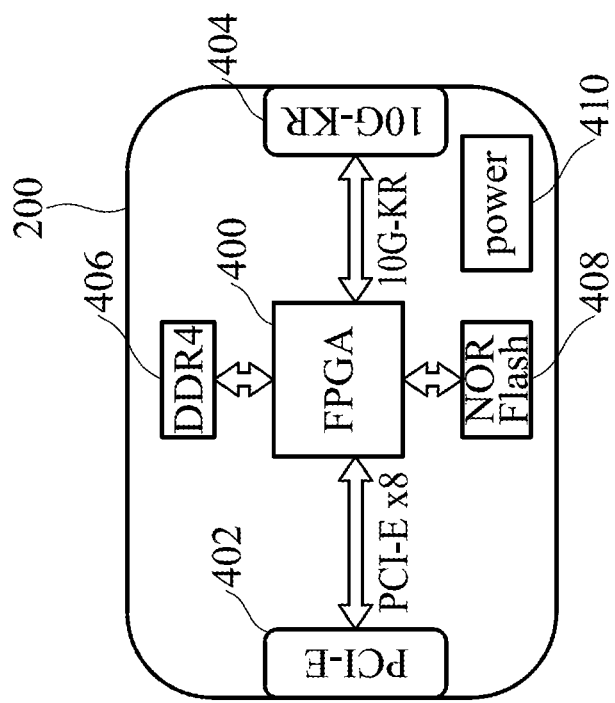
FIG. 4 is a schematic diagram of the network interface controller 200 of the motherboard circuit 104 in FIG. 2 in accordance with some embodiments of the disclosure.

FIG. 4 is a schematic diagram of the network interface controller 200 of the motherboard circuit 104 in FIG. 2 in accordance with some embodiments of the disclosure. As shown in FIG. 4, the NIC 200 includes an FPGA 400, a connector 402, a connector 404, a dynamic random-access memory (DDR4) 406, a NOR flash memory 408, and a power 410. In some embodiments, since the NIC 200 needs to receive the sensing data of external sensors (such as the sensors of the smart car 110), the number of data packets transmitted by the NIC 200 is very large. Therefore, if the NIC 200 cannot provide sufficient processing ability to effectively perform basic data processing tasks, data may be lost and performance may be reduced as a result. The FPGA 400 can combined its hardware performance, efficiency and programmable versatility, and has the ability to increase the speed and capacity of internal memory (for example, increase the speed and capacity of the dynamic random-access memory 406 and the NOR flash memory 408). Therefore, the FPGA 400 can improve data processing services, and has the advantages of lower R&D costs, short development time, and high flexibility.

In some embodiments, the FPGA 400 is electrically connected to the CPU 202 in FIG. 2 through the connector 402 and the PCI-e bus. The FPGA 400 is electrically connected to the network switching circuit 102 in FIG. 1 through the connector 404 and a 10GBASE-KR network line (that is, the connection line 130 in FIG. 1). The FPGA 400 sorts the sensing data received through the connector 404, and transmits the sorted sensing data to the CPU 202 through the connector 402 based on scheduling. The dynamic random-access memory 406 and the NOR flash memory 408 are used to store the sensing data needed in the sorting process. The power 410 is from the power supply circuit 106 in FIG. 1 and is used to provide power to all components of the NIC 200 in FIG. 4.

Figure 5:
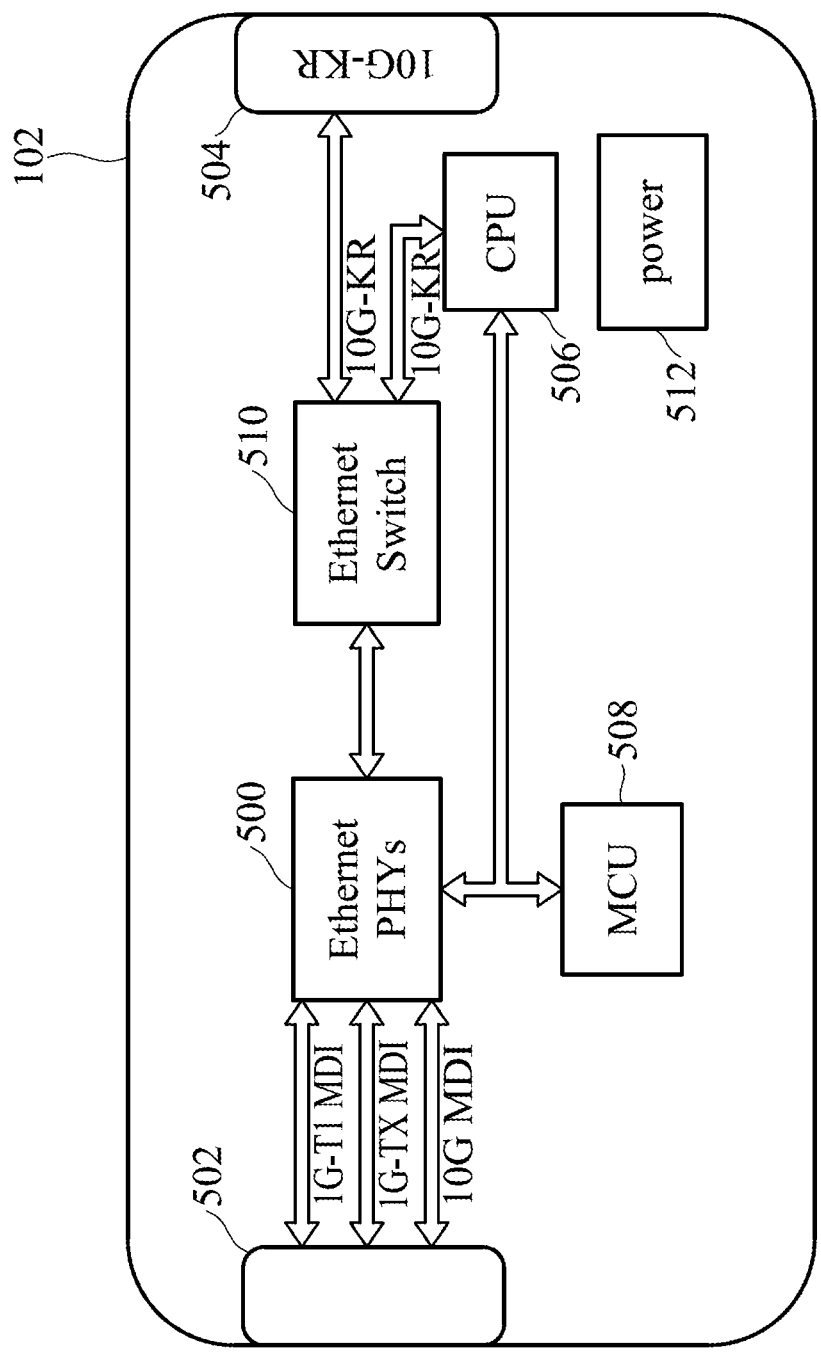
FIG. 5 is a schematic diagram of a network switching circuit 102 of the electronic device 100 in FIG. 1 in accordance with some embodiments of the disclosure.

FIG. 5 is a schematic diagram of a network switching circuit 102 of the electronic device 100 in FIG. 1 in accordance with some embodiments of the disclosure. As shown in FIG. 5, the network switching circuit 102 includes an Ethernet physical (Ethernet PHYs) chip 500, a connector 502, a connector 504, a CPU 506, a microcontroller (MCU) 508, an Ethernet switch 510, and a power 512. In some embodiments, the Ethernet physical chip 500 is electrically connected to the connector 502 through Gigabit Ethernet direct media interface buses (for example, 1 G-T1 MDI and 1 G-TX MDI) and a 10 Gigabit Ethernet direct media interface bus (for example, 10 G-MDI).

The connector 502 is electrically connected to the sensors of the smart car 110 through the connection line 120 (for example, a 10GBASE-KR network line) in FIG. 1. Therefore, the Ethernet physical chip 500 can directly receive the sensing data from the smart car 110. The Ethernet switch 510 determines whether to send the sensing data to the connector 504 through the 10GBASE-KR network line, or to send the sensing data to the CPU 506 through the 10GBASE-KR network line according to a control signal from the Ethernet physical chip 500.

The connector 504 is electrically connected to the connector 212 of the motherboard circuit 104 in FIG. 2 through the connection line 130 (for example, a 10 GBASE-KR network line). In other words, the Ethernet switch 510 can send the sensing data from the Ethernet physical chip 500 to the connector 504 according to the control signal of the Ethernet physical chip 500, so that the NIC 200 in FIG. 2 can receive the sensing data from the smart car 110. In some embodiments, the Ethernet switch 510 sends the sensing data to the CPU 506 through the 10GBASE-KR network line according to the control signal of the Ethernet physical chip 500. The CPU 506 performs data security processing on the sensing data. The MCU 508 provides security functions for the network switching circuit 102, and detects the power (such as the power 512) and the temperature of the network switching circuit 102.

On the other hand, the CPU 506 can also send the security-processed sensing data back to the Ethernet physical chip 500 through the Ethernet switch 510. Then, the Ethernet physical chip 500 sends the security-processed sensing data to the connector 504 through the Ethernet switch 510 for the CPU 202 of the motherboard circuit 104 in FIG. 2 to perform autonomous driving. Similarly, after analyzing and processing the sensing data, the CPU 202 of the motherboard circuit 104 in FIG. 2 can send autonomous driving control commands to the smart car 110 through the network switching circuit 102, so that the smart car 110 can correspondingly perform the autonomous driving. The internal working principle of the network switching circuit 102 is a conventional technology, so it will not be repeated in the specification. The power 512 is from the power supply circuit 106 in FIG. 1 to provide power to all components of the network switching circuit 102 in FIG. 5.

Figure 6:
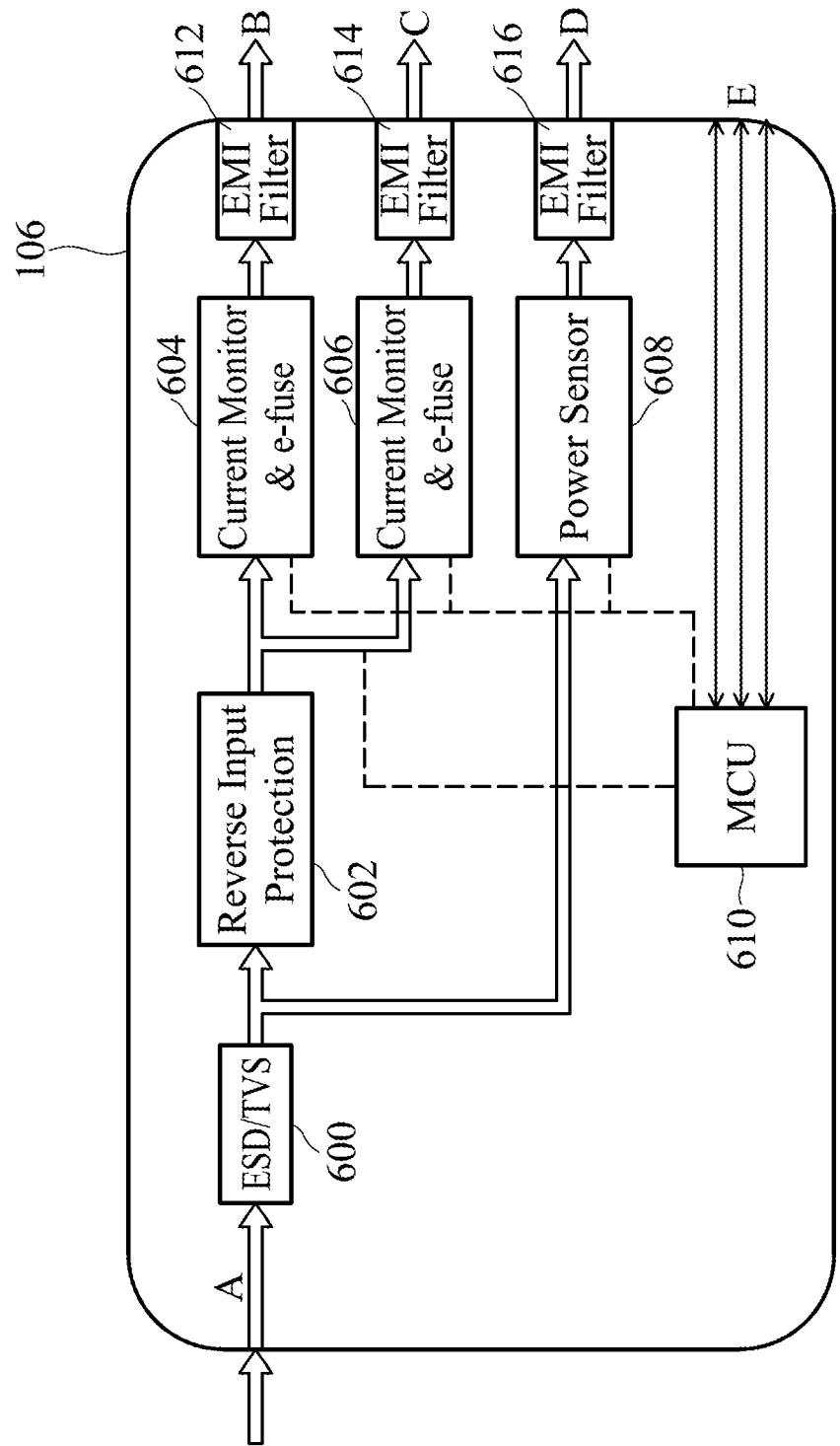
FIG. 6 is a schematic diagram of a power supply circuit 106 of the electronic device 100 in FIG. 1 in accordance with some embodiments of the disclosure.

FIG. 6 is a schematic diagram of a power supply circuit 106 of the electronic device 100 in FIG. 1 in accordance with some embodiments of the disclosure. As shown in FIG. 6, the power supply circuit 106 includes an electrostatic protection circuit (ESD/TVS) 600, a reverse input protection circuit 602, current detection and overcurrent protection circuits (Current Monitor & e-fuse) 604 and 606, a power sensor 608, a microcontroller (MCU 610), and EMI filters 612, 614, and 616. In some embodiments, the electrostatic protection circuit 600 includes at least one TVS diode to prevent the power supply circuit 106 from being damaged by static electricity. The electrostatic protection circuit 600 receives an input power A. The reverse input protection circuit 602 utilizes the characteristics of the diode (that is, only allowing current to pass in a signal direction) to avoid damage to the power supply circuit 106 when the polarity of the input voltage is reversed.

The current detection and overcurrent protection circuits 604 and 606 are used to detect the current from the power supply circuit 106. When the detected current is greater than a threshold, the current detection and overcurrent protection circuits 604 and 606 can cut off the output of the output powers B and C. The power sensor 608 is used to calculate the input/output power of the power supply circuit 106 and output an output power D. The MCU 610 can receive the voltage/current data from the current detection and overcurrent protection circuits 604 and 606 and the power data from the power sensor 608, and output the control signal E accordingly. EMI filters 612, 614, and 616 are used to perform EMI filtering on the input power A, so that the power supply circuit 106 can output the output powers B, C and D stably. The power supply circuit 106 in FIG. 6 of the present disclosure is merely an example, and the present disclosure is not limited thereto.

Figure 7:
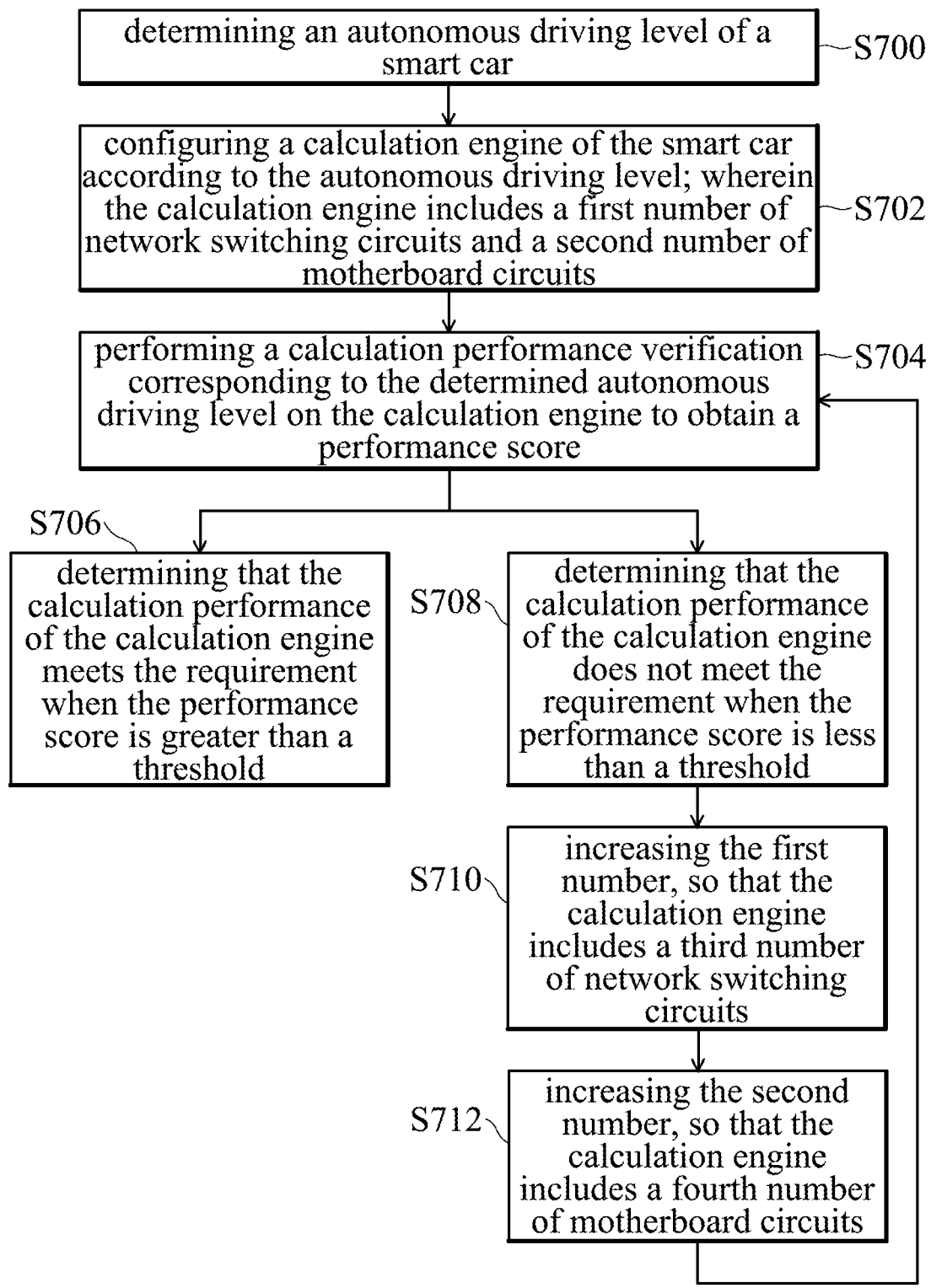
FIG. 7 is a flow chart of a method for configuring a calculation engine of a smart car 110 in accordance with some embodiments of the disclosure.

FIG. 7 is a flow chart of a method for configuring a calculation engine of a smart car 110 in accordance with some embodiments of the disclosure. The calculation engine may be, for example, the electronic device 100 in FIG. 1, including at least one network switching circuit (for example, the network switching circuit 102 in FIG. 1) and at least one motherboard circuit (for example, the motherboard circuit 104 in FIG. 1). The configuration method of the present disclosure includes: determining the autonomous driving level of the smart car 110 (step S700); and configuring the calculation engine (for example, the electronic device 100 in FIG. 1) of the smart car 110 according to the autonomous driving level, wherein the calculation engine includes a first number of network switching circuits and a second number of motherboard circuits (step S702). Then, the configuration method of the present disclosure further includes: performing a calculation performance verification corresponding to the determined autonomous driving level on the calculation engine to obtain a performance score (step S704); and determining that the calculation performance of the calculation engine meets the requirement when the performance score is greater than a threshold (step S706).

On the contrary, the configuration method of the present disclosure further includes determining that the calculation performance of the calculation engine does not meet the requirement when the performance score is less than the threshold (step S708); increasing the first number, so that the calculation engine comprises a third number of network switching circuits (step S710); and increasing the second number, so that the calculation engine comprises a fourth number of motherboard circuits (step S712). After that, the configuration method of the present disclosure re-executes the calculation performance verification corresponding to the determined autonomous driving level, that is, returns back to step S704 until the performance score is greater than the threshold (that is, the condition of step S706 is satisfied). In some embodiments, the first number is less than the second number, and the third number is less than the fourth number.

In some embodiments, the method for configuring the calculation engine of the smart car 110 of the present disclosure is to use the electronic device 100 to execute performance testing software (for example, Sysbench, Linpack, Chess Test Suite) to obtain the performance score in step S704. In some embodiments, the thresholds of performance scores corresponding to different autonomous driving levels are obtained through experiments or rules of thumb.

For example, the threshold of the performance score of autonomous driving level 4 is greater than the threshold of the performance score of autonomous driving level 3.

In some embodiments, when the performance score is less than the threshold, in addition to performing steps S710 and S712, the configuration method of the present disclosure can also upgrade the components in the motherboard circuit 102, such as upgrading the number of cores of the CPU 202, increasing the number of CPUs and GPUs, and increasing the capacity of the memory 206, and it is not necessary to re-propose hardware requirements and redesign. The configuration method of the present disclosure also only performs performance verification on a single motherboard circuit (for example, the motherboard circuit 104). Therefore, the configuration method of the present disclosure is simplified compared with the general hardware architecture design process, the relative development time is reduced, and the required cost is naturally relatively reduced.

The embodiments of the present disclosure are disclosed above, but they are not used to limit the scope of the present disclosure. A person skilled in the art can make some changes and retouches without departing from the spirit and scope of the embodiments of the present disclosure. Therefore, the scope of protection in the present disclosure shall be deemed as defined by the scope of the attached claims.

What is claimed is:

1. An electronic device, applied on a smart car with a plurality of sensors, comprising:
   at least one network switching circuit, coupled to the sensors of the smart car to receive sensing data from the sensors and output the sensing data;
   at least one motherboard circuit, comprising:
   a network interface controller (NIC), coupled to the at least one network switching circuit to receive the sensing data from the at least one network switching circuit;
   at least one central processing unit (CPU), coupled to the NIC, performing autonomous driving for the smart car according to the sensing data;
   a power supply circuit, providing power to the at least one network switching circuit and the at least one motherboard circuit;
   wherein the number of network switching circuits and motherboard circuits depends on an autonomous driving level of the smart car;
   wherein the higher the autonomous driving level of the smart car, the more network switching circuits and motherboard circuits are required;
   wherein when the autonomous driving level of the smart car increases from a first autonomous driving level to a second autonomous driving level, the number of network switching circuits and motherboard increases;
   wherein when the autonomous driving level of the smart car increases from the second autonomous driving level to a third autonomous driving level, the number of network switching circuits and motherboard increases, wherein the increased number of the network switching circuits is smaller than the increased number of motherboard circuits.

2. The electronic device as claimed in claim 1, wherein the at least one motherboard circuit further comprises at least one memory coupled to the at least one CPU; the at least one CPU comprises a direct memory access (DMA) controller; the DMA controller directly accesses the sensing data in the at least one memory.

3. The electronic device as claimed in claim 1, wherein the at least one motherboard circuit further comprises a platform controller hub (PCH) and a storage; the PCH receives the sensing data from the at least one network switching circuit, and stores the sensing data in the storage, or sends the sensing data to the at least one CPU to perform the autonomous driving of the smart car.

4. The electronic device as claimed in claim 1, wherein the at least one motherboard circuit comprises at least one graphics processing unit (GPU) to process image-related data and assist the at least one CPU to perform the autonomous driving for the smart car.

5. The electronic device as claimed in claim 1, wherein the at least one network switching circuit comprises:
   a first interface, coupled to the sensors of the smart car;
   a second interface, coupled to the at least one motherboard circuit;
   an Ethernet physical chip, receiving the sensing data of the sensors through the first interface, and sending the sensing data to the at least one motherboard circuit through the second interface.

6. The electronic device as claimed in claim 5, wherein the at least one network switching circuit further comprises:
   a processor, processing the sensing data for data security;
   a micro controller, providing a security function to the at least one network switching circuit, and detecting power and temperature of the at least one network switching circuit.

7. The electronic device as claimed in claim 1, wherein when the autonomous driving level of the smart car increases from the first autonomous driving level to the second autonomous driving level, the number of network switching circuits and motherboard increases from a first number to a second number, wherein the first number is smaller than the second number;
   wherein when the autonomous driving level of the smart car increases from the second autonomous driving level to the third autonomous driving level, the number of network switching circuits and motherboard increases from the second number to a third number, wherein the second number is smaller than the third number.

* * * * *